United States Patent Office 3,526,548
Patented Sept. 1, 1970

3,526,548
FUEL CELL ELECTRODES
Roland Accorsi, Cachan, Claude Hespel, Limours, René Vilhes, Viry Chatillon, Jean-Paul Pompon, Vitry-sur-Seine, and André Culand, Orsay, France, assignors to Compagnie Generale d'Electricite, Paris, France
Filed Dec. 9, 1966, Ser. No. 600,619
Claims priority, application France, Dec. 10, 1965, 41,679; Apr. 27, 1966, 50,379; July 11, 1966, 69,941; Oct. 11, 1966, 79,566
Int. Cl. H01m 27/00, 13/00
U.S. Cl. 136—86                    28 Claims

ABSTRACT OF THE DISCLOSURE

The present disclosure relates to fuel cell electrodes and fuel cells produced by the assemblage of a plurality of such electrodes. The plates of said electrodes are composed of electrically conductive porous material and elements of synthetic material which greatly facilitates the construction of the electrode and substantially reduces its weight. The electrodes are constructed such that the electrically conductive porous plates form a fluid tight chamber and when assembled together with other like electrodes forms additional fluid tight chambers.

BACKGROUND OF THE INVENTION

The present invention relates to a hollow electrode for use in fuel cells. More particularly, the present invention concerns an assembly of porous conductive elements and elements of plastic material which greatly facilitates the construction of the electrode and substantially reduces the weight. The present invention also concerns a fuel cell produced by assembling a plurality of such electrodes.

Various types of electrodes which can be used in fuel cells to produce electrical energy are well known. However, the prior art electrodes suffer from many deficiencies such as, for example, they are very complex in structure which makes them difficult to produce, increases their cost and creates problems in forming fuel cells composed of a plurality of such electrodes. Furthermore, presently known electrodes are of heavy construction which make them difficult to handle when assembling a plurality of such electrodes for use in fuel cells.

Accordingly, an object of the present invention is to avoid the disadvantages of the prior art electrodes and fuel cells.

Another object of the present invention is to provide an electrode comprising an assembly of porous conductive elements and elements of plastic material which greatly facilitate the construction of the electrode and substantially reduces its weight.

Other objects and further scope of applicability of the present invention will become apparent from the detailed description given hereinafter; it should be understood, however, that the detailed description and specific examples while indicating preferred embodiments of the invention, are given by way of illustration only, since various changes and modifications within the spirit and scope of the invention will become apparent to those skilled in the art from this detailed description.

SUMMARY OF THE INVENTION

The electrode of the present invention comprises a first plate and a second plate consisting of electrically conductive porous material, and an annular packing of synthetic material disposed between said plate, substantially along their periphery, said packing having a substantially T-shaped radial cross section and said plates being fixed on either side of the leg of the T, forming a fluid-tight chamber. The annular packing comprises at least one radial passage for the supply of gas to said chamber, and current collecting means in electrical contact with at least one of said platees provided in said chamber. Spacing members composed of the same synthetic material as the packing or of a material having a similar expansion coefficent are disposed between the two plates.

In accordance with one embodiment of the present invention, these spacing members comprise concentric annular elements defining a plurality of concentric annular chambers, said annular elements containing radial passages providing communication between said chambers.

DESCRIPTION OF THE DRAWINGS

The present invention will become fully understood from the detailed description hereinbelow and the accompanying drawings which are given by way of illustration only and thus are not to be construed as limitive of the present invention and wherein

FIG. 20 is a fragmentary sectional view along the line D—D of FIG. 16, FIG. 21 diagrammatically illustrates a fragmentary sectional view along a plane extending through the system for supplying combustion-assisting gas to the electrodes of a cell constructed by assembly in series of a number of electrodes as illustrated in FIGS. 16 to 20, FIG. 22 diagrammatically illustrates a fragmentary sectional view along a plane extending through the system for supplying fuel gas to the electrodes of a cell constructed by assembly on series of a number of electrodes as illustrated in FIGS. 16 to 20, FIG. 23 diagrammatically illustrates a fragmentary sectional view along a plane extending through the system for supplying electrolyte to a cell constructed by assembly in series of a number of electrodes such as those illustrated in FIGS. 16 to 20.

DESCRIPTION OF THE PREFERRED EMBODIMENTS

In FIGS. 1 to 9, the reference 1 denotes the conductive and porous plates produced, for example, by sintering metal powders and optionally having a porosity which can vary through their thickness. These plates are shown as being circular, but of course they may be of any desired shape. They are connected along their periphery by a plastic element 2 having a substantially T-shaped radial cross section. The plates are secured on both sides of the leg of the T so as to form a fluid-tight chamber. Spacing members 7 consisting of a plastic material are disposed between the plates. In the illustrated examples, these spacing members are circular and concentric. They are formed with apertures such as 8 extending through their thickness so as to enable circulation of the gases in the space bounded by two consecutive spacing members or by the central spacing member. Small metal tubes 9 of a length at least equal to the thickness of the spacing member under consideration are fitted into the aforesaid apertures.

Figure 1:
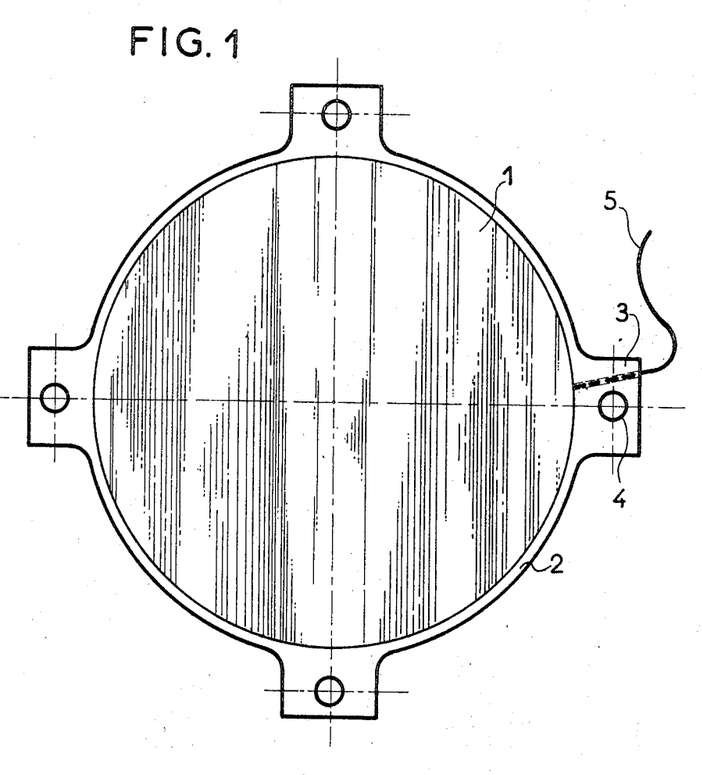
FIG. 1 illustrates a plan view of an electrode according to the present invention.
Figure 2:
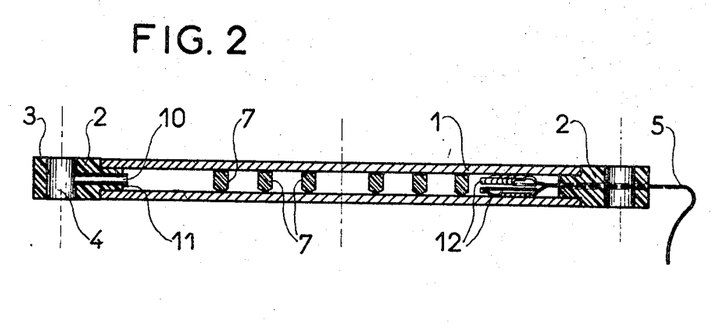
FIG. 2 is a sectional view of the electrode of FIG. 1.
Figure 3:
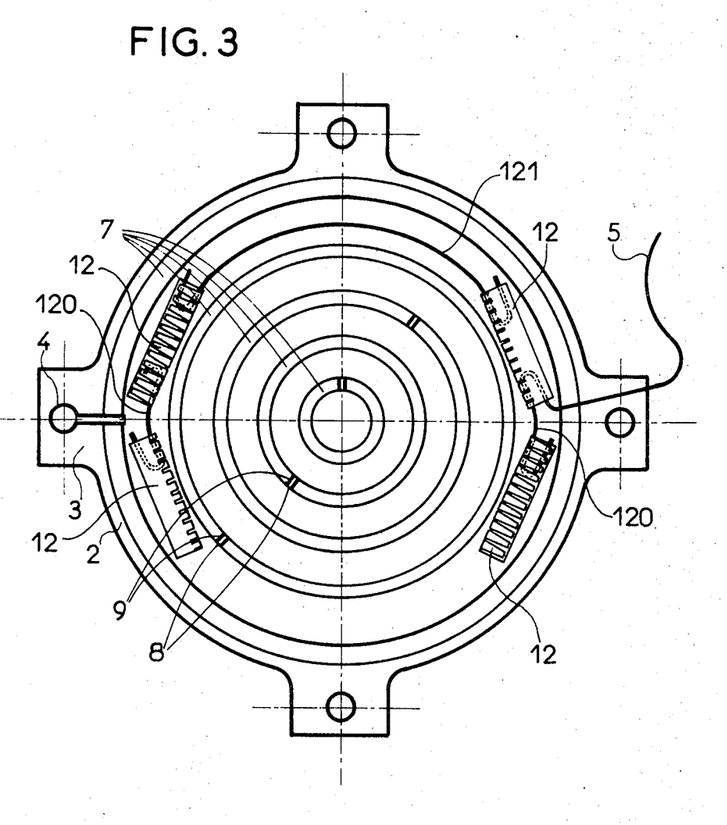
FIG. 3 illustrates a section through the electrode of FIG. 1 along its central plane.

The packing 2 comprises portions 3 having a radial dimension greater than the mean radial dimension of the packing, and in which there are disposed radial passages such as 10, which may be internally lined by a metal tube such as 11.

The portions 3 also contain ducts 4 parallel to the axis of the said packing, some of which are in communication with passages 10. The ducts 4 and the passages 10 are thus employed to supply gas to the electrodes and optionally to also discharge it therefrom. In addition, some of the ducts 4 are intended to enable the passage of assembly rods for stacking a number of electrodes.

Figure 6:
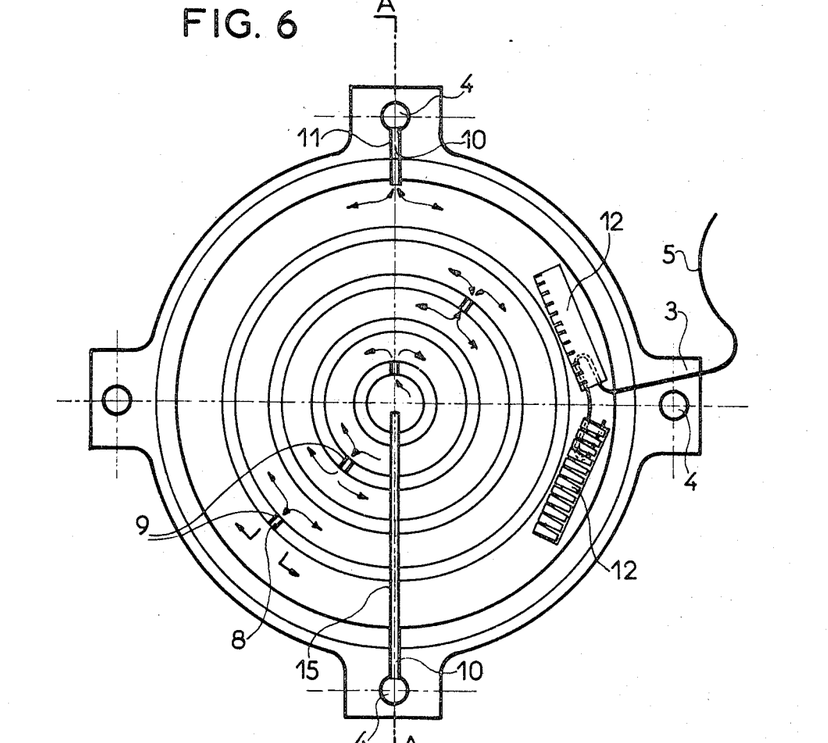
FIG. 6 illustrates a section along a central plane of an electrode which is a variant of that illustrated in FIGS. 2 and 3.

The current-collecting device of the present invention comprises at least one element, called an elementary collector, such as that illustrated in FIGS. 2, 3 and 6, which comprises two metal combs 12, which for example, can be composed of silver-plated beryllium-bronze, and comprise resilient lamellae which bear against each of the internal faces of the plates 1. The metal combs of an elementary collector are electrically connected by a metal wire 120, which is coated with a thin layer of an electrically conductive metal, for example, silver. The various elementary collectors are connected in series by a metal wire 121, which is also coated with a metal such as silver. The current of the electrode is collected by means of a metal wire 5 extending in a fluid-tight manner through the plastic element 2 and electrically connected to one of the elementary collectors. This metal wire is also coated with a layer of a metal such as silver in that part situated within the electrode to beyond the plastic element. The use of a number of collector elements disposed in series in the same electrode allows good current-collection.

In a modified construction, the elementary collector comprises an insulating portion which bears against the internal face of one of the plates of the electrode and a metal comb which bears against the internal face of the other plate, in such a manner that the said element is in electrical contact with only one of the two plates constituting the electrode. It is then possible to provide each electrode with two sets of elementary collectors, each of the sets being composed of a plurality of elementary collectors as described above, which are so disposed as to be all in electrical contact with the same plate of the electrode. Each set collects the current from one of the plates of the electrode. It is then possible to construct a series arrangement comprising a plurality of electrodes each provided with two sets of elementary current collectors.

Figure 8:
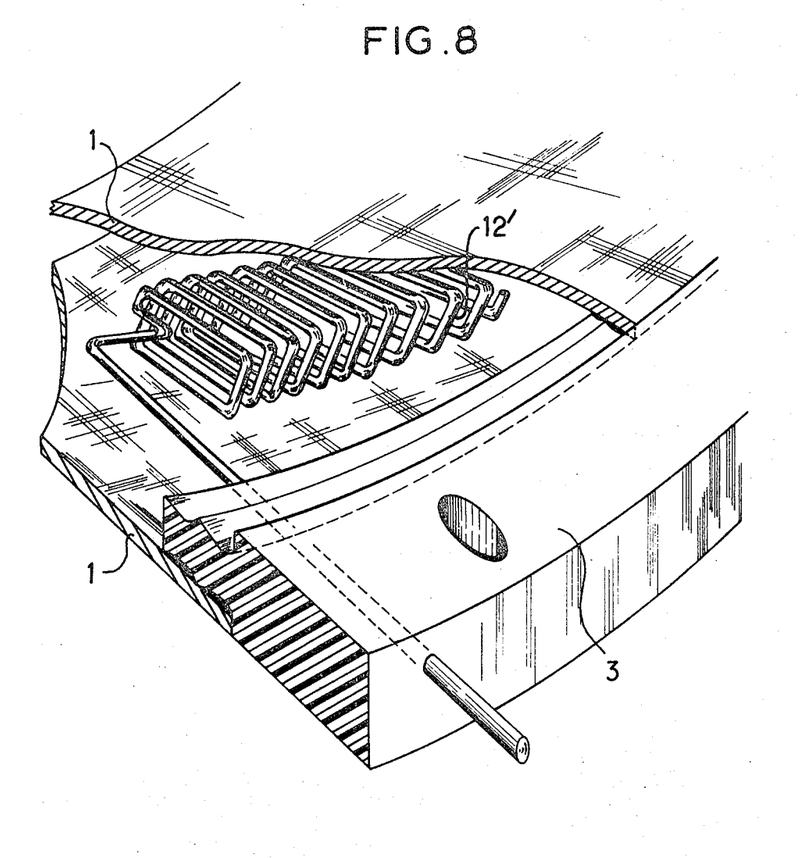
FIG. 8 is a semi-sectional view in isometric projection of an electrode provided with a current collector different from that illustrated in FIGS. 2 and 3.

The collector may also consist of a helically coiled wire, the axis of the coil extending parallel to the surfaces of the plates, and said coil being compressed between two plates so as to be elastically deformed. Advantageously, the turns forming the coil bear on the internal faces of the plates as substantially rectilinear portions. FIG. 8 is a semi-sectional view in isometric projection of an electrode provided with such a current collector. The current collector is denoted by the reference 12'. It consists of a helically coiled metal wire, coated for example with a layer of silver, the axis of the coil extending parallel to the plates compressing the collector. The turns have a rectangular form, so that the collector bears on the internal faces of the plates 1 by substantially rectilinear portions, which establishes a good electrical connection. The collector may, of course, consist of a number of helically coiled elements which are connected together by rectilinear or curvilinear portions.

Figure 4:
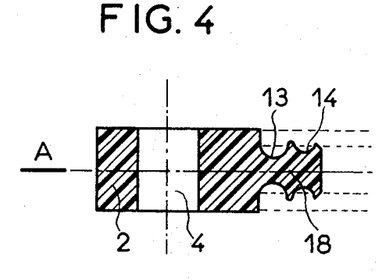
FIG. 4 is a sectional view of the plastic element supporting the porous plates before the plates are placed in position.
Figure 5:
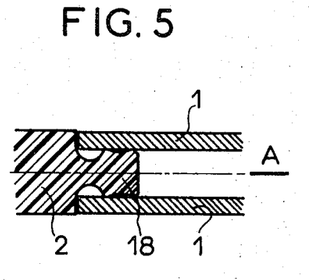
FIG. 5 illustrates a sectional view of the plastic element supporting the porous plates after the plates have been placed in position.

FIG. 4 illustrates a section through the plastic element 2 supporting the porous plates 1 before the latter are placed in position. In the case of circular plates, this element is ring-shaped. In an advantageous form of construction, as illustrated in FIG. 4, that portion 18 of the element 2 on which the plates 1 rest has in each face two grooves 13 and 14, the outer groove being slightly deeper. The mean thickness of the portion 18 before the porous plates are placed in position may be between about 1 and 2 mm. These grooves have the object of attenuating the flow of the synthetic material of the packing during the manufacture of the electrode and thus producing a better connection between the said packing and the conductive plates.

The plastic material of which the element 2 consists must satisfy conditions of stability in hot and concentrated electrolytes such as for example, 5 N potassium hydroxide at 80° C. The plastic material which can be used, for example is a polyamide such as the $C_{11}$ polyamide known under the trade name Rilsan.

Figure 7:
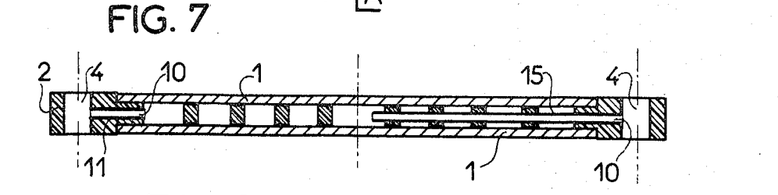
FIG. 7 is a vertical section along the line A—A of the electrode illustrated in FIG. 6.

It can be seen from FIGS. 2 and 3 that the gas chamber of the electrode is supplied only through a single distributing passage 10 issuing from duct 4 and furthermore, comprises no gas discharge passage. In FIGS. 6 and 7, the gas chamber communicates through two passages 10 with two ducts 4, one serving to supply the gas and the other to discharge it. A metal tube 15 is fitted into the supply passage 10 and is extended to the center of the electrode after having passed through the spacing members. Such an arrangement makes it possible to establish a gas circulation through the entire electrode. In the case of a fuel cell utilizing the reaction of oxygen and hydrogen, this circulation may be profitably used to eliminate the water produced by the reaction, which otherwise diffuses through the porous walls of the electrode, thereby diluting the electrolyte.

Figure 9:
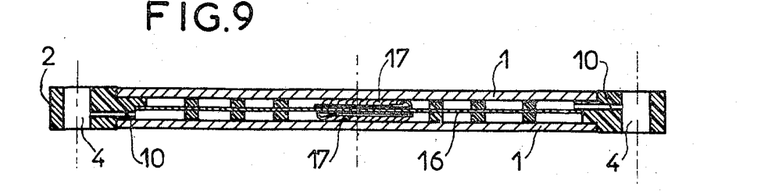
FIG. 9 is a sectional view of an electrode having double polarity according to the present invention.

FIG. 9 illustrates a sectional view through an electrode having double polarity constructed in accordance with the same principle as the above-described electrodes. Such electrodes are suitable for use more particularly in series assemblies. The electrode comprises two chambers, one of which is supplied with an oxidizing gas and the other with a fuel gas. These two chambers are formed by the interposition, between the two porous conductive plates 1, of a metal plate 16, for example, nickel, which is impermeable to gases and which rests on an appropriate step in the plastic element 2. Spacing members 7 are disposed on either side of the plate 16. Metal elements 17, such as combs comprising resilient lamellae or devices as illustrated in FIG. 8, also connect the plate 16 to the plates 1 and thus ensure passage of the current through the electrode.

In another particularly advantageous form of the present invention, the dimensions of the cross-section of the packing are such that the length of the cross-bar of the T is greater than the thickness defined by the thickness of the leg of the T plus the total thickness of the two porous plates. In this form of construction, therefore, at least one face of the packing is provided along its periphery with at least one ridge above the surface of the conductive plate situated on that side of the face under consideration. In this manner, a chamber can be defined between two opposed conductive plates by a combination of two similar electrodes.

Advantageously, the annular packing comprises two concentric ridges which thus define a cavity in which there may be disposed a packing, for example of toroidal form, which ensures a good fluid-tightness of the chamber defined by the two opposed conductive plates when two similar electrodes are combined. In this case, if a large number of similar electrodes are so combined that two successive electrodes are separated by a fluid-tight chamber defined by the rings of plastic material and the ridges which they comprise, the said chambers being filled with electrolyte, there is obtained a parallel arrangement of the electrodes, in which, on the one hand, the presence of a fluid-tight enclosure is unnecessary and, on the other hand, the quantity of electrolyte employed has been limited to the quantity strictly necessary for the operation of the cell. This form of construction of the packing is also applicable to bipolar electrodes.

Figure 10:
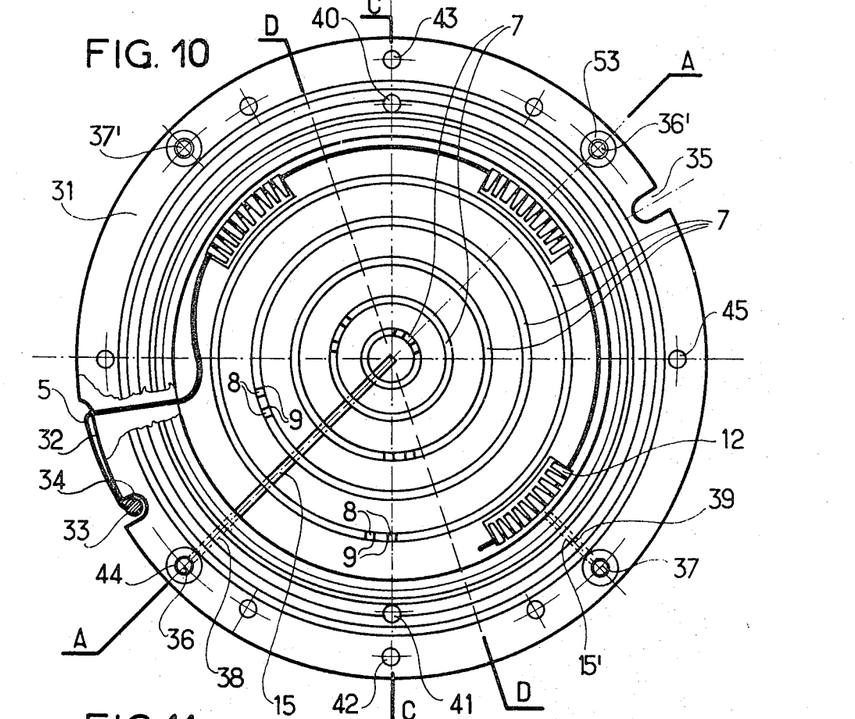
FIG. 10 is an elevational view of an electrode which is a variant of that illustrated in FIGS. 1 to 7, without its upper conductive plate.
Figure 11:
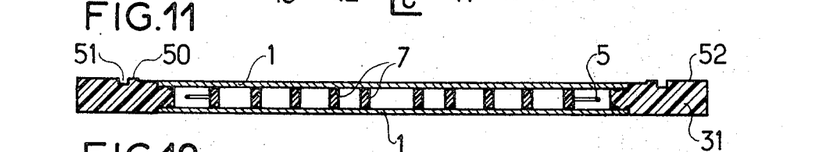
FIG. 11 is a sectional view, along the line D—D, of the electrode illustrated in FIG. 10.

In FIGS. 10 and 11, the reference 31 represents the packing of synthetic material which connects the two conductive plates 1 at their periphery. Spacing members 7 consisting of plastic material are disposed concentrically between the plates 1. The said spacing members are formed with apertures such as 8 extending through their thickness so as to enable circulating of the gases between the space defined by two consecutive spacing members or by the central spacing member. Small metal tubes 9 having a length equal to, or more than, the thickness of the spacing member under consideration are fitted into the aforesaid apertures. The current of the electrode is collected by means of a metal wire 5 extending through the plastic element and connected to metal combs 12 which bear against each of the internal faces of the plates, the aforesaid passage taking place in fluid-tight manner.

After passing through the plastic element 31, the wire 5 follows the periphery of this element along a recess 32 therein and connects with a metal bar 33 disposed perpendicular to the central plane of the said plastic element and situated in a notch 34 contiguous with recess 32. The plastic element also contains a notch 35 in its periphery diametrally opposed to the notch 34. The plastic ring 31 has a large number of apertures drilled through it perpendicular to its central plane. Thus, the reference 36 and 37 denote respectively the apertures for the supply of gas to the particular electrode under consideration and for the discharge of the said gas. The said apertures communicate with the internal space of the electrode through the passages 38 and 39. A metal tube 15 is fitted into the supply passage 38 and is extended to the center of the electrode after having passed through the spacing members 7. A metal tube 15' is fitted into the discharge passage 39.

The ring 31 is formed with similar apertures 36' and 37' which are diametrally opposite to the orifices 36 and 37, but which do not communicate with the internal space of the electrode. As will hereinafter be seen, these orifices are employed in the assembly of a number of similar electrodes for supplying gas to the electrodes situated on either side of the electrode under consideration and discharging it therefrom. Small metal tubes 44, for example of nickel, are fitted into the ducts 36, 37, 36' and 37' and facilitate the assembly of a number of electrodes. The apertures 41 and 42 and the diametrally opposed orifices 40 and 43 are used in the assembly of a number of similar electrodes for supplying and conveying the electrolyte. The apertures 45 are intended to enable the passage of tie rods in the assembly of a number of electrodes.

Figure 12:
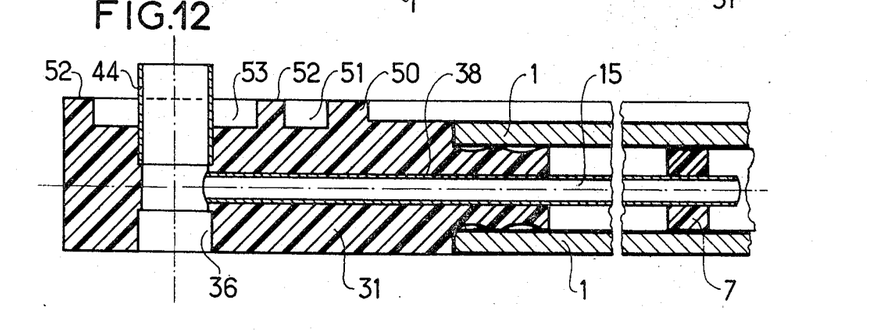
FIG. 12 is a fragmentary sectional view along the line A—A of FIG. 10.

As will be seen from FIG. 11, the upper face of the plastics element is provided on its periphery with a slight ridge 50 extending above the surface of the conductive plate and spaced by a groove 51 from an external ridge 52 of the same height. The height of the ridge 50 may, for example, be between about 0.2 and 2 mm. The groove 51 is intended to receive a packing, for example of toroidal form, in the assembly of a number of electrodes. In that face of the plastic element which is formed with ridges of this kind, the apertures 36, 37, 36' and 37' are situated adjacent grooves 53 intended to receive packings in the assembly of a number of electrodes. FIG. 12 is a fragmentary sectional view along the line A–A of FIG. 10, i.e., along a plane perpendicular to the plates of the electrode and extending through the axis of the supply passage of the electrode. As can be seen from this figure, the small metal tube 44 is engaged in the orifice 36 of the ring 31 so as to be flush with the supply passage 38 and has sufficient length to fit into a corresponding passage in a second coupled electrode. In the assembly of a number of electrodes, packings consisting of a material resistant to the electrolyte and to the gases employed, such as, for example, perbunan, which is a copolymer of butadiene and acrylonitrile, are disposed in the grooves 53 and in the groove 51.

Figure 13:
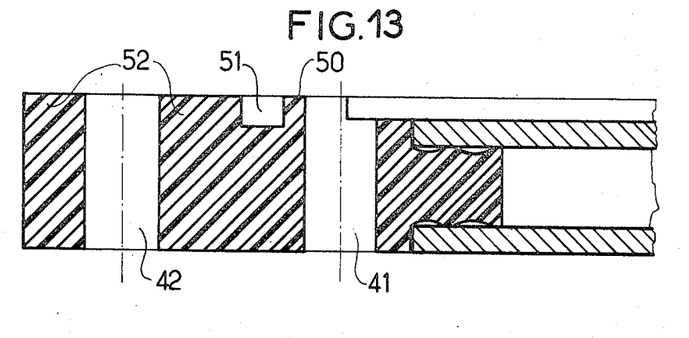
FIG. 13 is a fragmentary sectional view along the line C—C of FIG. 10.

FIG. 13 is a fragmentary sectional view along the line C—C of FIG. 10, i.e., along a plane perpendicular to the plates of the electrode and extending through the axis of the electrolyte supply passage. The aperture 41 is formed adjacent the ridge 50. It is employed, like the orifice 42 situated adjacent the ridge 52, in the manner described in the following, to convey the electrolyte after the assembly of a number of electrodes.

Figure 14:
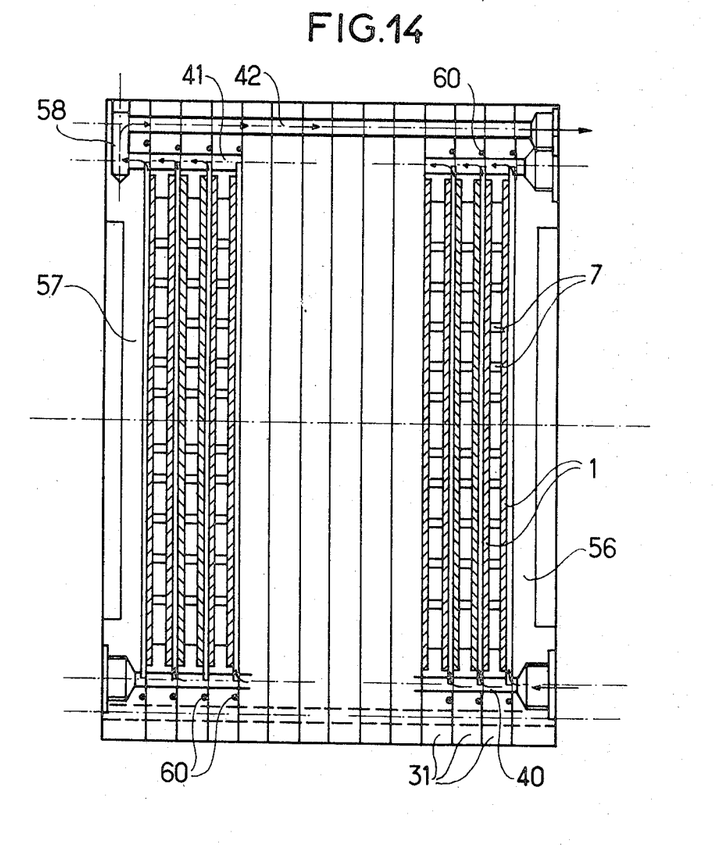
FIG. 14 is a diagrammatic fragmentary sectional view along a plane extending through the device supplying electrolyte to a cell constructed by assembly in parallel of a number of electrodes such as those illustrated in FIG. 10 to 13.
Figure 15:
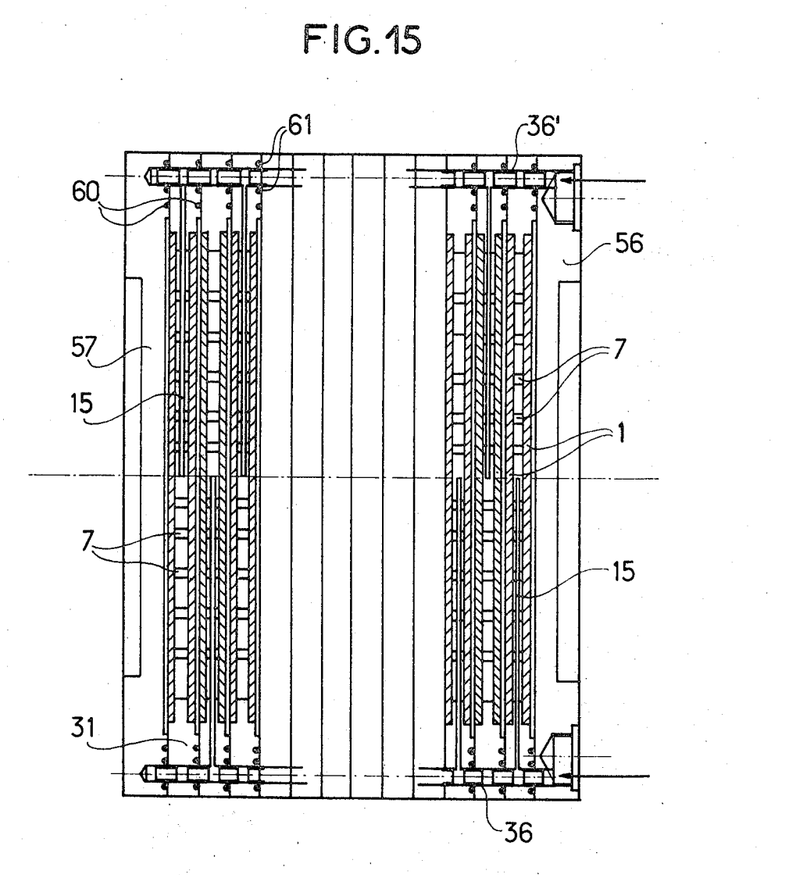
FIG. 15 shows, in diagrammatic form, a fragmentary sectional view along a plane extending through the system for supplying gas to the electrodes of a cell constructed by assembly in parallel of a number of electrodes such as those illustrated in FIGS. 10 to 13.
Figure 16:
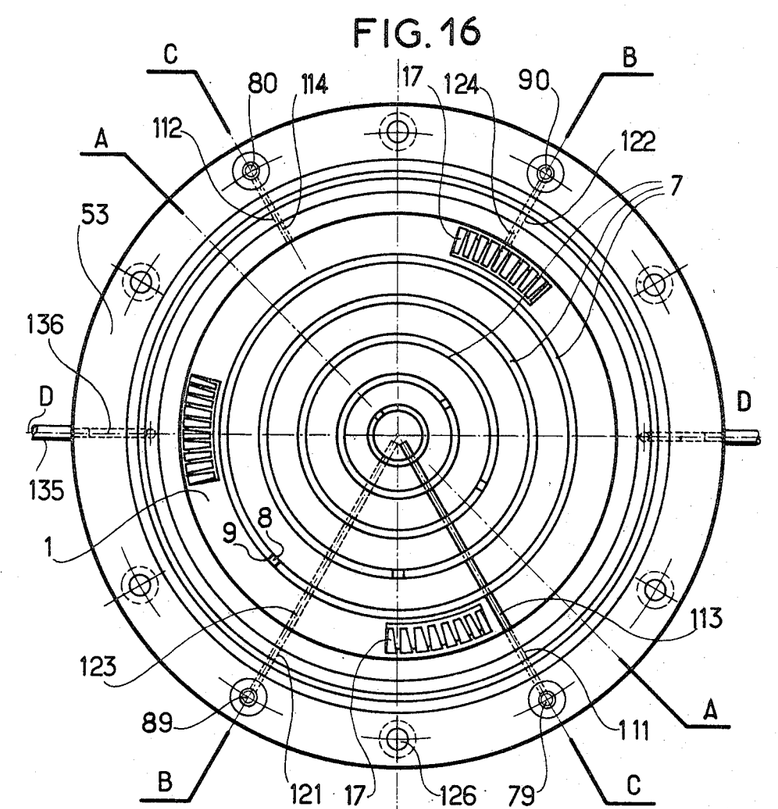
FIG. 16 is an elevational view of an electrode without its upper conductive plate, which is a variant of that illustrated in FIG. 9.

FIG. 14 shows diagrammatically a fragmentary sectional view along a plane extending through the electrolyte supply device of a cell constructed by assembling in parallel a number of electrodes according to the present invention. FIG. 15 illustrates a fragmentary sectional view of this cell along a plane extending through the gas supply system. In this assembly, a number of electrodes similar to that previously described are juxtaposed so that the apertures and recesses performing the same functions in two successive electrodes are diametrally opposed and one face having no ridge, in the plastic element 31 of one electrode is built onto a face having a ridge.

The references 56 and 57 denote respectively the terminal flanges of plastic material, such as for example, perspex. The flange 57 in contact with a ridgeless face of a plastic element is hollowed so as to form a chamber with the conductive disc facing it. The electrodes and the terminal flanges are assembled and pressed one on to the other by means of tie rods engaged in the orifices 45 in the plastic rings, the said tie rods having screwthreaded ends on which are disposed nuts, if desired with the interposition of resilient washers.

The apertures 40 and 41 in the two plastic rings define, after assembly, passages which, owing to the particular arrangement of the said apertures, i.e., adjacent the ridges 50, communicate with the chambers defined by the opposite faces of two neighboring electrodes. The electrolyte, such as for example, potassium hydroxide, therefore penetrates into the aforesaid chambers through the passage formed by the apertures 40, and is discharged through the passage formed by the apertures 41. In the illustrated constructional example, the latter passage communicates with that formed by the orifices 42 by way of a passage 58 in the flange 57, so as to eliminate the electrolyte through the face through which it has penetrated, but such an arrangement is by no means necessary. The passage formed by the orifices 43 is not used, the orifices 43 owing their existence to the symmetry which must be exhibited by an electrode since two consecutive electrodes are in fact offset by 180° when they are assembled.

By reason of this fact and because of the previously indicated arrangements as may be seen from FIG. 15, the gas supply passages formed by the apertures 36 and 36' communicate respectively with one electrode out of two, the small nickel tubes 44 being fitted into the plastic rings of two consecutive electrodes. The same is the case with the discharge passages formed by the orifices 37 and 37'.

Packings 60, for example of toroidal form, are disposed in the grooves 51 in the plastic elements 31, as also packings 61 in the grooves 53.

Two collector bars (not shown) are disposed in the passages formed by the notches 34 and 35, the current lead-out wires of the electrodes supplied with the same gas being connected to a common bar.

FIGS. 16 to 23 correspond to dipolar electrodes and to the cells constructed by assembly of these electrodes, and wherein the dimensions of the cross-section of the plastic packings are such that the length of the cross-bar of the T is greater than the thickness defined by the thickness of the leg of the T plus the total thickness of the said two porous plates.

In these figures, the reference 16 denotes a gas-impermeable metal plate, for example, nickel, which is disposed between two plates 1, said plates being composed of porous and conductive material. These plates together with two plastic elements 53 and 53' form two similar chambers 54 and 54'. Circular spacing members 7 composed of plastic are disposed concentrically between the plates. They are formed with apertures, such as 8, extending through their thickness, to permit circulation of the gases between the space defined by two consecutive spacing members or by the central spacing member. Small metal tubes 9 of a length equal to at least the thickness of the spacing member under consideration are fitted into the aforesaid apertures. Metal elements 17, such as combs comprising resilient lamellae, electrically connect the plate 16 to the plates 1 and thus ensure passage of the current through the electrode. The plastic elements 53 and 53' and the plate 16, of the same diameter in the illustrated constructional form, are formed with a large number of common apertures.

Thus, the references 79 and 80 represent, respectively, diametrally opposed apertures enabling gas to be supplied to the chamber 54 of the electrode and the said gas to be discharged from the electrode. These apertures communicate with the internal space of the said chamber 54 through passages 111 and 112. A metal tube 113, for example, nickel, is fitted into the supply passage 111 and is extended to the center of the chamber 54 after having passed through the spacing members 7. A metal tube 114 is fitted into the discharge passage 112. To correspond to the apertures 79 and 80, angularly offset apertures 89 and 90 which enable gas to be supplied to chamber 54' of the electrode and the said gas to be discharged from the electrode. These apertures communicate with the internal space of the said chamber 54' through passages 121 and 122. A metal tube 123 is fitted into the supply passage 121 and is extended to the center of the chamber after having passed through the spacing members 7. A metal tube 124 is fitted into the discharge passage 122. Small metal tubes 125, for example, nickel tubes, are fitted into the apertures 79 and 80, 89 and 90 and facilitate the assembly of a number of electrodes, as will hereinafter be seen. The reference 126 denotes apertures intended to allow the passage of tie rods for the assembly of a number of electrodes.

The plate 16 may have a smaller diameter than the plastic packings 53 and 53', for example equal to that of plates 1. In this case, the packings 53 and 53' may form a single unit, the plate 16 being positioned in the central plane of this packing. As may be seen from FIGS. 17 to 20, the packings 53 and 53' comprise a step 150 on which there rest the porous plates, and which is equal in height to the said plates. Situated above the step 150 is a ridge 130, the height of which may be, for example, between about 0.2 and 2 mm. This arrangement may be on each side of the electrode as illustrated, or on only one side. The packing 53 comprises in addition a groove 131 situated on the ridge 130 and intended to receive a packing, for example of toroidal form, in the assembly of a number of electrodes. In the free face of the plastic element 53', the orifices 79, 80, 89 and 90 for the supply and the discharge of gas are situated at the base of grooves 132 intended to receive packings in the assembly of a number of electrodes. As may be seen from FIGS. 18 and 19, the small metal tubes 125 are disposed in the apertures 79, 80, 89 and 90 on the side on which the grooves 132 are situated, the opposed ends of the apertures 79, 80, 89 and 90 having a diameter which is slightly larger than the mean diameter of the said apertures so as to permit the introduction of the tubes 125 in the assembly of the electrodes. The grooves 132 and the groove 131 are intended to receive packings, for example, of toroidal form, consisting of a material which is resistant to the gases and to the electrolyte employed in the production of a multi-electrode assembly.

Figure 20:
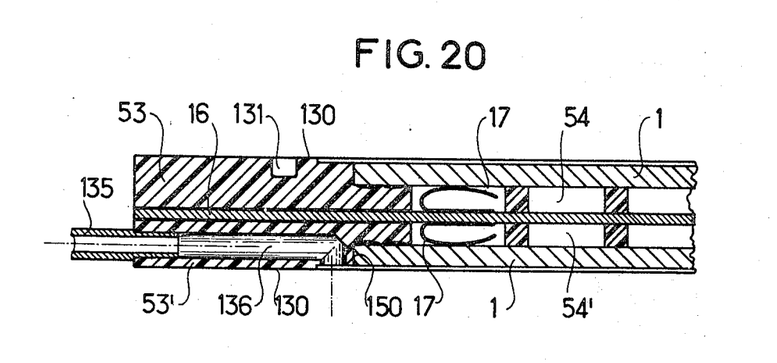

FIG. 20 shows diagrammatically a fragmentary sectional view along a plane extending through the electrolyte supply device. As may be seen from this figure, this device consists of a passage 136 extending partially through the plastic element 130 and leading to the upper surface of the step 150 in the neighborhood of the porous plate 1. The reference 135 denotes an electrolyte-resistant tube which is fitted into the aperture of the supply passage leading to the edge of the plastic element 53'. This tube may, for example, be composed of nickel or of some appropriate plastic material. Diametrically opposite to the passage 136, the element 53' has another similar passage used for the discharge of the electrolyte. If desired, there may be disposed between the plate 16 and the plastic elements 53 and 53' a flat washer adapted to absorb the expansion difference between the materials of which the said plate and the said plastics element consist.

If therefore, a large number of similar electrodes as described in the foregoing are assembled in such a manner that two successive electrodes are separated by a fluid-tight chamber defined by the packings of synthetic material and the ridges provided thereon, the said chambers being filled with electrolyte, there is thus obtained a series assembly of the electrodes, wherein the presence of a fluid-tight enclosure is unnecessary and wherein the quantity of electrolyte employed is limited to the quantity necessary for the operation of the cell.

Figure 21:
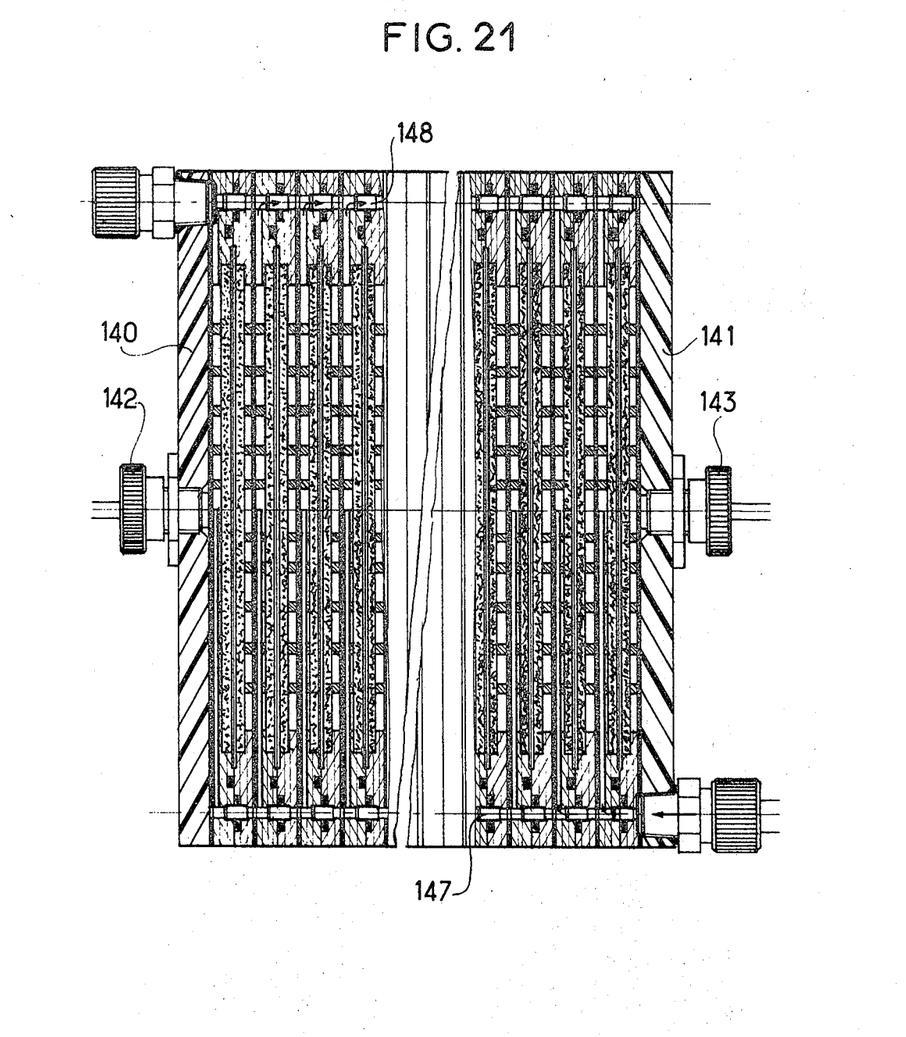
Figure 22:
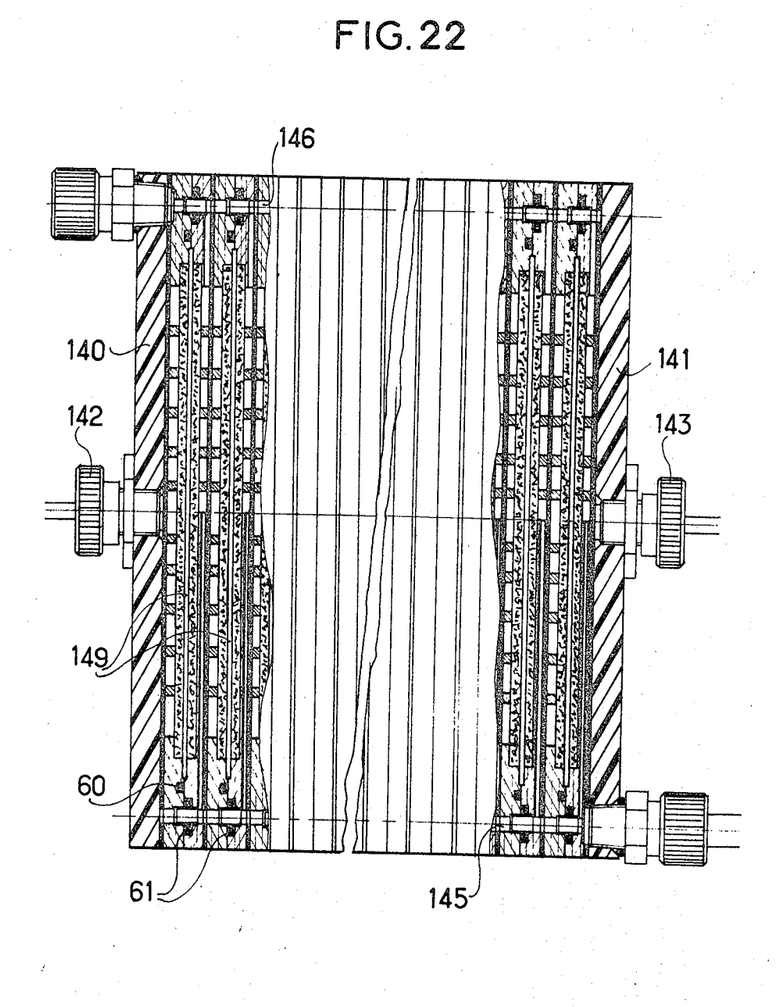
Figure 23:
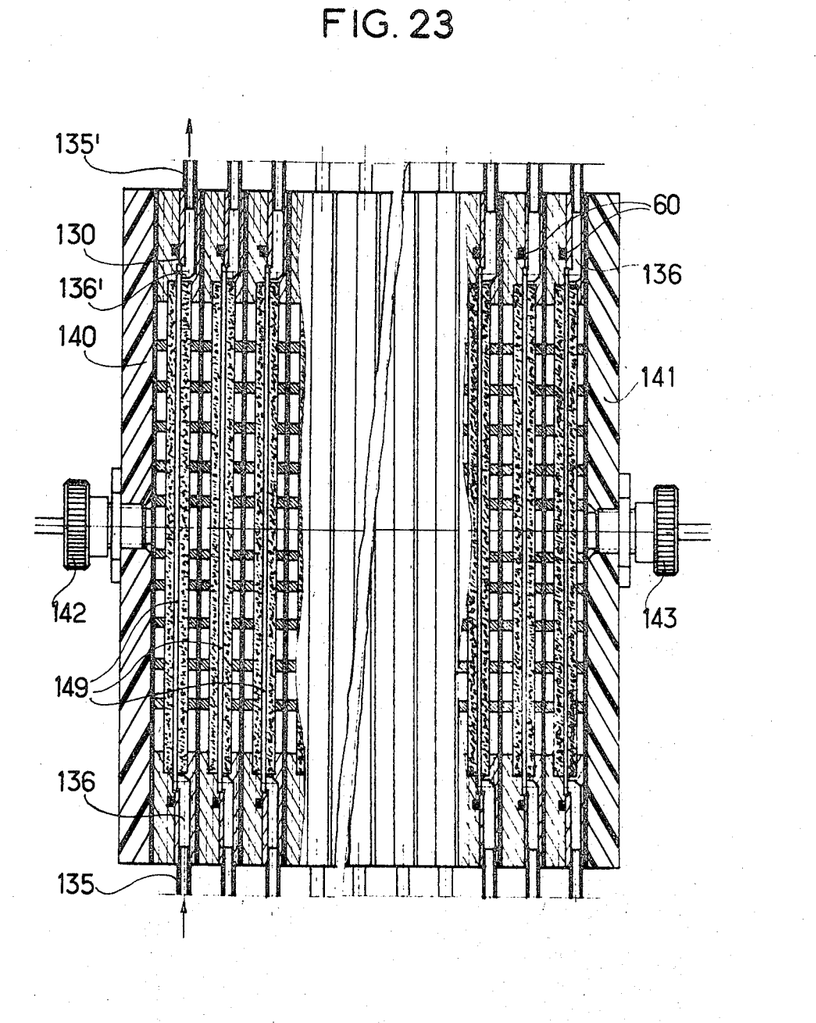

FIGS. 21 to 23 show diagrammatically, fragmentary sectional views of a cell constructed by the assembly, in series, of a number of electrodes such as those illustrated in FIGS. 16 to 20. The electrodes are so assembled that one face of one plastic element of an electrode formed with passages for the circulation of electrolyte is opposite to a face of a plastic element of a second electrode not having such ducts.

The references 140 and 141 denote respectively the terminal flanges consisting of metal or plastic material. The terminal electrodes in contact with these flanges are distinguished from the electrodes constituting the body of the cell by the fact that they are monopolar electrodes containing only one chamber. This is a direct result of the series assembly envisaged.

The references 142 and 143 denote the current-collecting terminals which are in electrical contact with the terminal electrodes.

The terminal electrodes and flanges are assembled and pressed one onto the other by means of tie rods engaged in the orifices 126 in the plastic elements, the said tie rods having screwthreaded ends which receive nuts, with the interposition of resilient washers, if desired. As may be seen from FIG. 21, the apertures 79 and 80 define, after assembly, two passages 147 and 148 communicating with the chambers such as 54 which are supplied with the combustion-assisting gas in two successive double-polarity electrodes, such chambers being separated by a chamber supplied with the fuel gas. The same is the case with the apertures 89 and 90, which define passages 145 and 146 serving for the supply and discharge of the fuel gas for the chambers such as 54'. The ridges 130 form with the porous plates opposite two successive electrodes, electrolyte chambers 149. The electrolyte is fed into these chambers by means of passages 136 into which the tubes 135 are partially fitted. These tubes may be connected to a single distributing passage, but it is then necessary for the tube 135 to have a particular length in order to avoid electrical losses due to short-circuiting between two consecutive electrodes. The electrolyte is discharged from the chambers 149 through the passages 136' diametrally opposed to the passages 136. In passages 136' there are partially engaged tubes 135' which may be connected to a single collecting passage. Another advantageous arrangement comprises connecting the electrolyte outlet tube 136' of one electrode to the electrolyte inlet tube 136 in the adjacent electrode and so on. In this way, there is obtained an electrolyte circuit which defines a path between two consecutive electrodes. Packings 60 and 61 for example of toroidal form, are disposed respectively in the grooves 131 and 132 of the plastic elements.

An electrode of monopolar type, as described and illustrated in the foregoing discussion may be produced as follows. Packing is provided with the passages and ducts for the supply and if necessary the discharge of gas through an appropriate aperture in the said packing. The conductor wire which is connected to the current collector is introduced and is placed in position. The packing is thereafter disposed on an appropriate support and the spacing members, formed with their apertures lined by a metal tube and if desired connected by a metal tube fitted into a supply channel, are appropriately disposed. A porous conductive plate is then laid upon that portion of the plastic element which has the smallest thickness and is welded to said element and at the same time to spacing members by applying a source of heat under pressure to said plate. The heat thus supplied is transmitted to the packing and to the spacing members through the conductive porous plate. This achieves a welding of these elements. During this phase, the internal portion of the plastic packing undergoes a slight flow, which is attenuated by the grooves in the packing. The assembly thus formed is then turned over and the second porous plate is welded in the same manner.

In one variation of the method of construction according to the present invention, the heating necessary for the welding of the packing to the porous plates is effected by means of a heating device which is distinct from the compression device, for example high-frequency heating.

In another variation of the method of construction, the two porous plates are simultaneously welded in the course of one operation. Thus, the compression device employed to apply the porous conductive plate to that portion of the packing which has a small thickness is a double-acting device permitting simultaneous welding of the two porous plates.

In still a further variation of the method of construction according to the present invention, the assembly of the porous plates is obtained by injection of plastic material fluidized by heating. It is possible by this variant to obtain better gas-tightness of the electrode at its periphery and better adhesion between the plates and the packing.

If it is desired to produce an electrode having double polarity of the type illustrated in FIG. 9, the gas-impermeable metal plate is first welded to an appropriate part of the packing and provided with gas collecting and distributing passages. There are then welded on either side of the said metal plate the means intended to ensure an electrical contact between the said plate and the porous conductive plates, the spacing members and finally the porous conductive plates on the appropriate portions of the packing.

Figure 17:
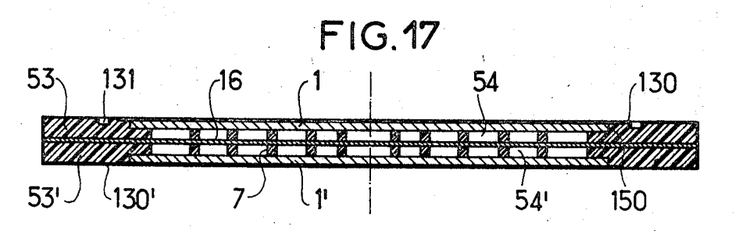
FIG. 17 is a sectional view along the line A—A of the electrode illustrated in FIG. 16.
Figure 18:
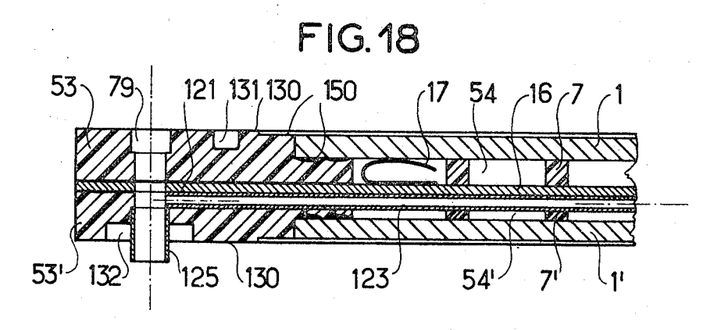
FIG. 18 is a fragmentary sectional view along the line B—B of FIG. 16.
Figure 19:
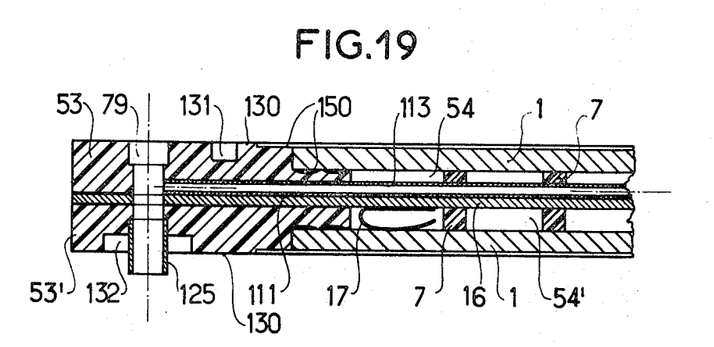
FIG. 19 is a fragmentary sectional view along the line C—C of FIG. 16.

If it is desired to produce an electrode having double polarity of the type illustrated in FIG. 17, there are disposed on either side of the gas-impermeable metal plate, packings provided with gas collecting and distributing passages, means intended to ensure an electrical contact between the said plate and the porous plates, spacing members and then the porous plates.

The method is also applicable when the gas-impermeable metal plate has a smaller diameter than the plastic elements. In this case, either the two plastic packings can be formed as a single packing or those portions of the packings which are not separated by the metal plate can be welded together.

As previously stated, the conductive and porous plates can be produced, for example, by sintering various metal powders. Many kinds of metals can be used for this purpose. Typical of the metals which can be used for manufacturing sintered electrodes are nickel and silver, such as described in our application Ser. No. 373,609, filed on June 5, 1964.

The terminal flanges 56 and 57 referred to in column 6 and shown in FIG. 14 can be made of a material such as, for example, perspex, which is polymethyl methacrylate. The term plastic, as used throughout the specification, is intended to be exemplary of one type of synthetic material which can be used according to the present invention. By plastic is meant synthetic polymers.

Since modifications of this invention will be apparent to those skilled in the art, it is not desired to limit the invention to the exact constitution shown and described. Accordingly, all suitable modifications and equivalence may be resorted to which fall within the scope of the appended claims.

It is claimed:

1. An electrode assembly for use in a fuel cell which comprises a first and a second plate of electrically conductive porous material, packing disposed between said plates substantially along their periphery forming a fluid-tight chamber, a plurality of concentric spacing members which close on themselves, said spacing members dividing the fluid-tight chamber into a plurality of parallel-extending chambers, at least one aperture provided in each of said spacing members, thereby providing direct communication between adjacent chambers, and a gas conduit means extending through the packing into the outermost chamber.

2. The electrode assembly of claim 1 wherein current-collecting means are disposed in at least one of said chambers and in electrical contact with at least one of said plates.

3. The electrode assembly of claim 1 wherein the aperture in the spacing members are off-set with respect to each other.

4. The electrode assembly of claim 1, wherein the packing has a substantially T-shaped radial cross-section.

5. The electrode assembly of claim 4, wherein the surfaces of the packing extending between the porous plates contain concentric grooves, said plates being secured to said surfaces thus forming said fluid-tight chamber.

6. The electrode assembly of claim 5, wherein the porous plates contain two concentric grooves, the outer groove being deeper than the inner groove.

7. The electrode assembly of claim 1, wherein the packing contains at least one radial passage communicating with said gas conduit means for supplying gas to said outermost chamber.

8. The electrode assembly of claim 1, wherein another gas conduit means extends through the packing into the innermost chamber.

9. The electrode of claim 1, wherein the packing has in its periphery a recessed portion contiguous with a notch, wherein there are disposed current pick-up means which are in electrical contact with the current-collecting means disposed within the chamber.

10. The electrode of claim 1, wherein a gas-impermeable metal plate is disposed substantially in the central plane of said packing between the first and second porous plates said metal plate and said packing defining with said porous plates two fluid-tight chambers, said packing containing radial conduit means extending into said respective chambers said fluid-tight chambers containing means for ensuring electrical contact between each of the said porous plates and the metal plate.

11. The electrode of claim 10, wherein spacing members are disposed between each of the porous plates and said metal plate.

12. The electrode of claim 10, wherein the means for establishing electrical contact between each of said porous plates and the metal plate comprises at least one metal comb type contact having lamellae bearing against the said plates.

13. The electrode of claim 11, wherein in each chamber defined by the porous plate and the gas-impermeable metal plate is a conduit means defining a channel for the supply of gas which extends through radial channels in said spacing members to the innermost chamber of said plurality of parallel extending chambers, and a gas discharge conduit means which extends radially through the packing into the outermost chamber of said plurality of parallel extending chambers.

14. The electrode of claim 10, wherein the metal plate disposed in the central plane of the packing divides said packing into two portions, thereby providing a portion of the packing between said metal plate and the inner surfaces of said porous plates, the outer surfaces being free of packing material.

15. The electrode of claim 14, wherein the two halves of the cross-bar of the T extend to a substantially equal distance beyond the level of the external surfaces of the porous plates.

16. A fuel cell comprising a plurality of electrodes of claim 14, wherein said electrodes are assembled together to provide between them fluid-tight chambers intended to contain an electrolyte, said cell also containing means for supplying electrolyte to the electrolyte chambers.

17. The electrode of claim 2, wherein the current collecting means comprises a comb type contact connected to an electrical conductor which extends through the packing in a fluid-tight manner.

18. The electrode of claim 17, wherein the current collecting means for establishing electrical contact comprises at least one comb type contact having lamellae bearing against the two plates.

19. The electrode of claim 2, wherein the current collecting means comprises a helically coiled wire, the axis of the coil being disposed parallel to the plates, said coil being compressed between the two plates so as to be elastically deformed, and said wire being connected to an electrical conductor extending through said packing in a fluid-tight manner.

20. The electrode of claim 19, wherein the turns forming the coil bear against the internal faces of the plates in substantially rectilinear portions.

21. The electrode of claim 4, wherein the dimensions of the cross-section of the packing are such that the length of the cross-bar of the T is greater than the thickness defined by the thickness of the leg of the T plus the total thickness of said two porous plates.

22. The electrode of claim 21, wherein the cross-section of said packing is asymmetrical, one of the halves of the cross-bar of said T extending beyond the level of the external surface of one of said porous plates, while the other half of the cross-bar of said T terminates at the level of the external surface of the other one of said porous plates.

23. The electrode of claim 21 wherein a portion of the cross-bar of the T which extends beyond the level of the external surface of the porous plate is cut away along the periphery of the porous plate.

24. A fuel cell comprising a plurality of electrodes of claim 22, wherein said electrodes are assembled together to provide between them fluid-tight chambers intended to contain an electrolyte, said cell also containing means for providing communication between said electrolyte chambers.

25. The cell of claim 24, wherein the means providing communication between the electrolyte chambers contains passages within the packings of said electrodes and extending parallel to their axis.

26. The electrode of claim 8, wherein the packing comprises portions having a radial dimension greater than the mean radial dimension of the packing, and in which there are disposed said gas conduit means.

27. The electrode of claim 26, wherein the aforesaid portions of the packing contain ducts which are parallel to the axis of the said packing, said ducts communicating with the gas conduit means.

28. The electrode of claim 26, wherein the aforesaid portions of the packing contain ducts which are parallel to the axis of the said packing, said ducts providing a means for the passage of assembly rods for stacking a number of electrodes.

References Cited

UNITED STATES PATENTS

| | | | |
|---|---|---|---|
| 2,276,188 | 3/1942 | Greger | 136—86 |
| 3,051,769 | 8/1962 | Jammet | 136—133 |
| 3,126,302 | 3/1964 | Drushella | 136—86 |
| 3,146,131 | 8/1964 | Linden et al. | 136—86 |
| 3,188,242 | 6/1965 | Kordesch et al. | 136—86 |
| 3,236,692 | 2/1966 | Lewis | 136—86 |
| 3,359,134 | 12/1967 | Savadori et al. | 136—86 |

WINSTON A. DOUGLAS, Primary Examiner

H. A. FEELEY, Assistant Examiner

U.S. Cl. X.R.

136—120